United States Patent
Takenaka

(10) Patent No.: US 6,711,603 B1
(45) Date of Patent: Mar. 23, 2004

(54) FRACTIONAL, ARITHMETIC UNIT, FRACTIONAL ARITHMETIC METHOD, SET-UP ENGINE FOR HANDLING GRAPHIC IMAGES AND COMPUTER-READABLE MEDIUM

(75) Inventor: Yasuharu Takenaka, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 565 days.

(21) Appl. No.: 09/583,574

(22) Filed: May 31, 2000

(30) Foreign Application Priority Data

May 31, 1999 (JP) .......................... P11-152944

(51) Int. Cl.[7] .............................................. G06F 7/52
(52) U.S. Cl. ...................................................... 708/650
(58) Field of Search ................. 708/650, 651, 708/654, 655, 656; 345/441; 380/28

(56) References Cited

U.S. PATENT DOCUMENTS

| | | | | |
|---|---|---|---|---|
| 5,012,438 A | * | 4/1991 | Yamaguchi | 708/654 |
| 5,020,017 A | * | 5/1991 | Ooms et al. | 708/650 |
| 5,307,303 A | * | 4/1994 | Briggs et al. | 708/654 |
| 5,768,170 A | | 6/1998 | Smith | |
| 6,088,453 A | * | 7/2000 | Shimbo | 380/28 |
| 6,094,201 A | * | 7/2000 | Malamy et al. | 345/441 |
| 6,115,733 A | * | 9/2000 | Oberman et al. | 708/654 |
| 6,240,338 B1 | * | 5/2001 | Peterson | 708/654 |

* cited by examiner

Primary Examiner—Todd Ingberg
Assistant Examiner—Chat C. Do
(74) Attorney, Agent, or Firm—Oblon, Spivak, McClelland, Maier & Neustadt, P.C.

(57) ABSTRACT

A fractional arithmetic unit for performing fractional arithmetic operations of different numerators and a common denominator with different precisions as required, the fractional arithmetic unit, including a reciprocal number arithmetic logic unit; and a multiply arithmetic circuit configured to multiply a numerator and a reciprocal number of the denominator as obtained by the reciprocal number arithmetic logic unit. A precision of a calculation performed by the reciprocal number arithmetic logic unit is changed in accordance with a precision as required for each of the fractional arithmetic operations. The multiply arithmetic circuit outputs a result of multiplication as a result of the fractional arithmetic operation, and the results of the fractional arithmetic operations are output with different precisions.

17 Claims, 6 Drawing Sheets

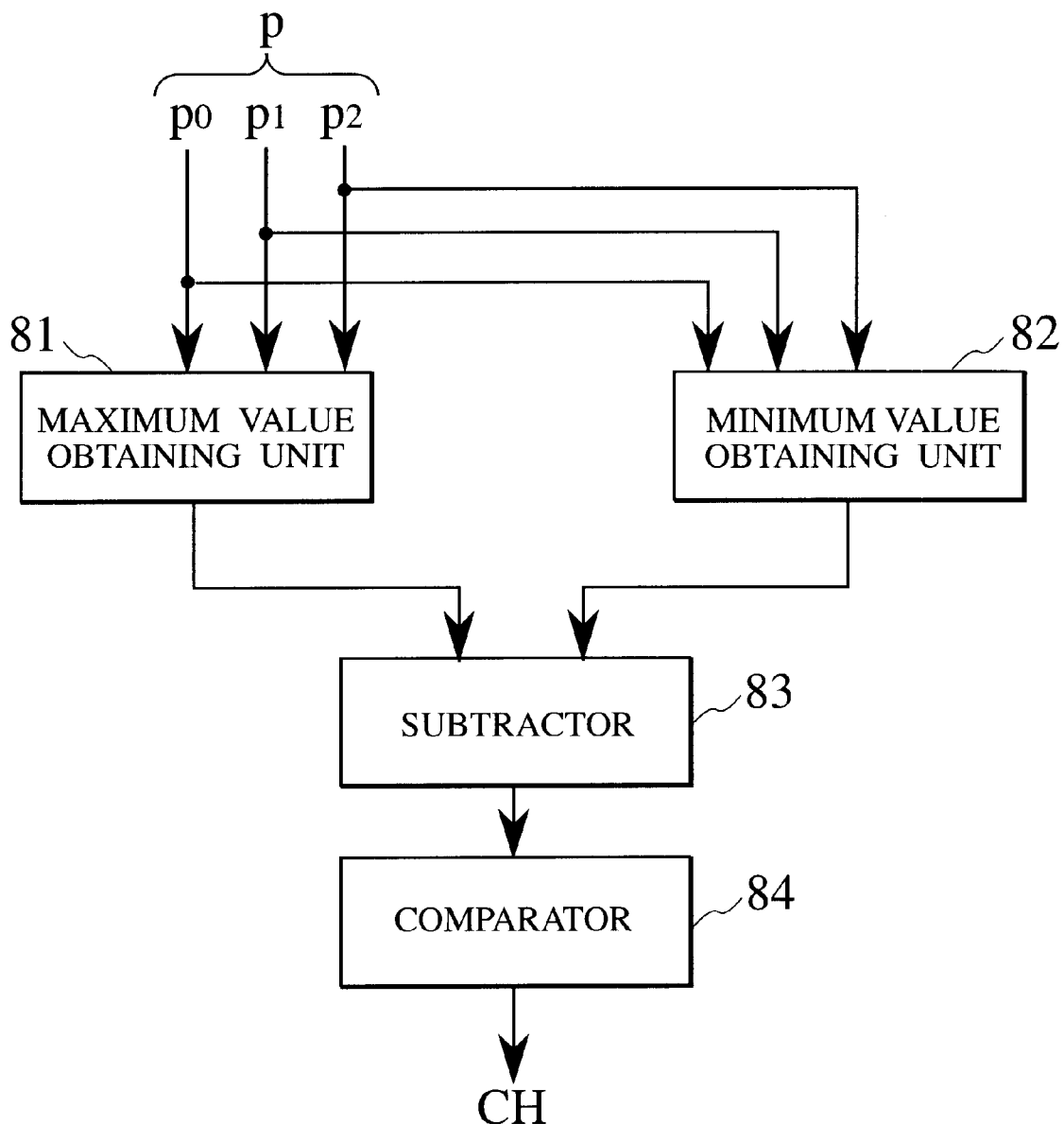

FRACTIONAL, ARITHMETIC UNIT, FRACTIONAL ARITHMETIC METHOD, SET-UP ENGINE FOR HANDLING GRAPHIC IMAGES AND COMPUTER-READABLE MEDIUM

BACKGROUND OF THE INVENTION

1. Field of the Invention

The present invention is related to a fractional arithmetic unit, a fractional arithmetic method, a set-up engine for handling graphic images implemented with the fractional arithmetic unit in the field of the 3D graphics technique, and a computer-readable medium for using the fractional arithmetic method.

2. Description of the Related Art

FIG. 1 is a schematic diagram showing a typical 3D graphics system for drawing triangles, rectangles, lines and so forth as known in the field of 3D computer graphics.

As illustrated in the same figure, the 3D graphics system is composed of a set-up engine 91 and a rasterizer 92. The set-up engine 91 serves to receive information IN about vertices of each of draw primitives such as triangles, rectangles, lines and so forth, calculate parameters required for generating pixel data and output the parameters to a pixel generator of the rasterizer 92.

The rasterizer 92 serves to generate the pixel data and perform the operation of the respective pixels. The result of the operation is stored in a VRAM 95 comprising a frame buffer and a Z buffer and drawn in the screen of a monitor not shown in the figure.

The pixel generator of the rasterizer 92 as described above has to be designed to calculate color values of (R,G and B, i.e., red, green and blue), α values(A), fog coefficients (F), texture coordinates (STRQ), and depth values (Z), usually by the sequentially accumulative addition (DDA; Digital Differential Analyzer).

The sequentially accumulative addition is performed by obtaining the differential value between the property values after and before unit pixel shift for each property. The necessary operation is performed by the set-up engine 91.

In the case that a triangle is rasterized as a draw primitive, the differential value as described above is calculated by the following plane equation (1) in general.

$$\partial p/\partial x = \{(p2-p0)(y1-y0)-(p0-p1)(y0-y2)\}e0 \quad (1)$$

In the above plane equation (1), p0, p1 and p2 are the property values of the respective vertices; e0 is twice the area of the triangle; and $\partial P/\partial x$ is the gradient in the X-direction.

The conventional set-up engine 91 as illustrated in FIG. 1 is composed in general of a fractional arithmetic unit including a denominator calculation unit 101, a numerator calculation unit 102 and a division unit 103 as illustrated in FIG. 2.

Two operations are required for each property value in the set-up engine 91 in the X-direction and in the Y-direction. Also, for each of the two operations, required calculations are two multiply operations as performed by the denominator calculation unit 101, additional two multiply operations as performed by the numerator calculation unit 102, and one division operation as performed by the division unit 103.

Usually, in the case of the 3D graphics system, there are a number of the property values as described above to be processed respectively by several operations as described above.

However, there are following shortcomings (1) and (2) in the conventional 3D graphics system as described above.

(1) The operations as described above places heavy burden on the set-up engine so that it is required for improving the operational speed to provide much hardware resources. Particularly, the primary problem is the division operation which has to be repeatedly performed. In the case that an integer arithmetic unit (fixed point arithmetic unit), the division operation has to be performed for the respective calculation. In the case of the prior art fractional arithmetic unit as illustrated in FIG. 2, a plurality of the division units 103 have to be arranged in parallel for the purpose of improving the processing speed.

(2) Furthermore, taking the precision of arithmetic operations into consideration, it is understood that there are many calculations which are roughly performed as fixed point arithmetic operations. In this case, while certain property values are represented with a fixed bit length (referred to as the integer bit hereinbelow), internal arithmetic operations (accumulative operations) have to be performed also with lower bits (referred to as fractional bits hereinbelow). The bit length of the fractional bits is determined by the accumulation times (i.e., maximum shift). For example, in the case that the X,Y space is $2^{12} \times 2^{12}$, there are 15 to 16 fractional bits as required. Because of this, high precision arithmetic operations are required to the set-up engine, and then a large number of clocks are consumed by the high precision arithmetic operations.

In this manner, the set-up engine is implemented with much hardware resources, and is operated with a number of clocks to complete arithmetic operations taking a much processing time.

SUMMARY OF THE INVENTION

The present invention has been made in order to solve the shortcomings as described above. It is an object of the present invention to provide a fractional arithmetic unit capable of high speed operations with a small scale hardware, a fractional arithmetic method, a set-up engine for handling graphic images implemented with the fractional arithmetic unit in the field of the 3D graphics technique, and a computer-readable medium for using the fractional arithmetic method.

It is another object of the present invention to provide an improved fractional arithmetic unit, a fractional arithmetic method, a set-up engine for handling graphic images implemented with the fractional arithmetic unit in the field of the 3D graphics technique, and a computer-readable medium for using the fractional arithmetic method, in which the performance of the 3D graphics engine is adjusted depending upon the areas of the draw primitive.

In brief, the above and other objects and advantages of the present invention are provided by a new and improved fractional arithmetic unit comprising: a reciprocal number arithmetic logic unit; and a multiply arithmetic circuit for multiplying the numerator and the reciprocal number of a denominator as obtained by said reciprocal number arithmetic logic unit, wherein the precision of the calculation performed by said reciprocal number arithmetic logic unit is controlled in accordance with the precision as required for a fractional arithmetic operation; and wherein said multiply arithmetic circuit outputs the result of multiplication as the result of said fractional arithmetic operation.

Also, in accordance with a preferred embodiment of the present invention, said reciprocal number arithmetic logic unit is composed of a reciprocal number arithmetic logic circuit which serves to improves the precision of calculation by repeating the reciprocal number arithmetic operation.

Furthermore, in accordance with a preferred embodiment of the present invention, said reciprocal number arithmetic logic unit is composed of the reciprocal number arithmetic logic circuit which serves to perform floating point arithmetic operations.

In accordance with another aspect of the present invention, a fractional arithmetic unit comprises: a denominator calculation unit for calculating a denominator from an input value: a numerator calculation unit for calculating a numerator from said input value; a floating point conversion unit for converting the output of said denominator calculation unit to a floating point value; a reciprocal number calculation unit for performing the reciprocal number arithmetic operation for obtaining the reciprocal number of the output of said floating point conversion unit on the basis of a repetition technique for improving the precision of calculation by repeating the operation; and a multiply arithmetic circuit for multiplying the output of said reciprocal number calculation unit and the output of said numerator calculation unit, wherein said multiply arithmetic circuit is composed of an arithmetic precision judgment unit for judging whether or not the output of said reciprocal number calculation unit reaches a precision as required for a fractional arithmetic operation; wherein if said arithmetic precision judgment unit makes a judgment as not reaching the sufficient precision as required, said reciprocal number calculation unit continues repeating the reciprocal number arithmetic operation until the output of said reciprocal number calculation unit reaches the sufficient precision as required; and wherein when the sufficient precision as required is reached, said multiply arithmetic unit 65 initiates the multiply arithmetic operation and outputs the result of multiplication as the output of said fractional arithmetic operation.

Furthermore, in accordance with a preferred embodiment of the present invention, if said arithmetic precision judgment unit judges that the precision of calculation as required is reached, the multiply arithmetic operation by said multiply arithmetic circuit is immediately initiated without further repetition.

In accordance with a further aspect of the present invention, a set-up engine for handling graphic images comprises the fractional arithmetic unit as described above, wherein the fractional arithmetic operation as performed by said fractional arithmetic unit is to calculate the gradient value of property values as assigned respectively to the pixels constituting draw primitives in the X-direction and in the Y-direction.

In accordance with a further aspect of the present invention, a fractional arithmetic method is implemented with a fractional arithmetic unit comprising: a denominator calculation unit for calculating a denominator from an input value; a numerator calculation unit for calculating a numerator from said input value; a floating point conversion unit for converting the output of said denominator calculation unit to a floating point value; a reciprocal number calculation unit for performing the reciprocal number arithmetic operation for obtaining the reciprocal number of the output of said floating point conversion unit on the basis of a repetition technique for improving the precision of calculation by repeating the operation; and a multiply arithmetic circuit for multiplying the output of said reciprocal number calculation unit and the output of said numerator calculation unit.

The fractional arithmetic method is used for subsequently performing fractional arithmetic operations from an operation thereof having a lower precision as required to an operation thereof having a higher precision as required in which, while a common denominator is used for said fractional arithmetic operations, the numerator of each fractional arithmetic operation is calculated anew by the fractional arithmetic unit.

In this case, each fractional arithmetic operation is performed by a step of calculating by calculating said denominator from said input value by means of said denominator calculation unit; a step of for calculating said numerator from said input value by means of said numerator calculation unit; a step of for converting the result of the calculation from said denominator calculating step to a floating point value by means of said floating point conversion unit; a step of calculating the reciprocal number of said denominator as converted by said floating point conversion step by means of said reciprocal number calculation unit; a step of judging whether or not the output of said reciprocal number calculation unit has a sufficient precision as required for each of a plurality of said fractional arithmetic operations for the purpose of achieving said precision as required which has been predetermined; a step of repeating the operation by said reciprocal number calculation unit, if the sufficient precision as required is judged as not reached on the basis of the result of said judging step, until the sufficient precision as required of the reciprocal number output from said reciprocal number calculation unit is reached; and a step of outputting the result of the fractional arithmetic operation by multiplying the result of the numerator calculation and the result of said reciprocal number calculation by means of said multiply arithmetic circuit after the sufficient precision as required of the reciprocal number output from said reciprocal number calculation unit is reached.

Furthermore, in accordance with a preferred embodiment of the present invention, when the output of said reciprocal number calculation unit reaches the sufficient precision as required, said outputting step is immediately initiated without repeating the operation.

In accordance with a further aspect of the present invention, a fractional arithmetic method is implemented with a fractional arithmetic unit comprising: a denominator calculation unit for calculating a denominator from an input value; a numerator calculation unit for calculating a numerator from said input value; a floating point conversion unit for converting the output of said denominator calculation unit to a floating point value; a reciprocal number calculation unit for performing the reciprocal number arithmetic operation for obtaining the reciprocal number of the output of said floating point conversion unit on the basis of a repetition technique for improving the precision of calculation by repeating the operation; and a precision obtaining unit for obtaining the precision as required of the fractional arithmetic operation by said reciprocal number calculation unit from said input value; and a multiply arithmetic circuit for multiplying the output of said reciprocal number calculation unit and the output of said numerator calculation unit.

The multiply arithmetic circuit is then composed of an arithmetic precision judgment unit for judging whether or not the output of said reciprocal number calculation unit reaches the precision as required which has been obtained by said precision obtaining unit.

Furthermore, if said arithmetic precision judgment unit makes a judgment as not reaching the sufficient precision as required, said reciprocal number calculation unit continues repeating the reciprocal number arithmetic operation until the output of said reciprocal number calculation unit reaches the sufficient precision as required; and when the sufficient precision as required is reached, said multiply arithmetic unit initiates the multiply arithmetic operation and outputs the result of multiplication as the output of said fractional arithmetic operation.

Furthermore, in accordance with a preferred embodiment of the present invention, if said arithmetic precision judgment unit judges that the precision of calculation as required is reached, the multiply arithmetic operation by said multiply arithmetic circuit is immediately initiated without further repetition.

Furthermore, in accordance with a preferred embodiment of the present invention, the fractional arithmetic operation as performed by said fractional arithmetic unit is to calculate the gradient value of property values as assigned respectively to the pixels constituting draw primitives in the X-direction and in the Y-direction.

Furthermore, in accordance with a preferred embodiment of the present invention, the fractional arithmetic operation as performed by said fractional arithmetic unit is to calculate the gradient value of property values as assigned respectively to the pixels constituting draw primitives in the X-direction and in the Y-direction.

In accordance with a further aspect of the present invention, a fractional arithmetic method is implemented with a fractional arithmetic unit comprising: a denominator calculation unit for calculating a denominator from an input value; a numerator calculation unit for calculating a numerator from said input value; a floating point conversion unit for converting the output of said denominator calculation unit to a floating point value; a reciprocal number calculation unit for performing the reciprocal number arithmetic operation for obtaining the reciprocal number of the output of said floating point conversion unit on the basis of a repetition technique for improving the precision of calculation by repeating the operation; and a multiply arithmetic circuit for multiplying the output of said reciprocal number calculation unit and the output of said numerator calculation unit.

The fractional arithmetic method is used for subsequently performing fractional arithmetic operations from an operation thereof having a lower precision as required to an operation thereof having a higher precision as required in which, while a common denominator is used for said fractional arithmetic operations, the numerator of each fractional arithmetic operation is calculated anew by the fractional arithmetic unit.

In this case, each fractional arithmetic operation is performed by:

a step of calculating by calculating said denominator from said input value by means of said denominator calculation unit; a step of for calculating said numerator from said input value by means of said numerator calculation unit; a step of for converting the result of the calculation from said denominator calculating step to a floating point value by means of said floating point conversion unit; a step of calculating the reciprocal number of said denominator as converted by said floating point conversion step by means of said reciprocal number calculation unit; a step of obtaining the precision as required of the fractional arithmetic operation by said reciprocal number calculation unit from said input value; a step of judging whether or not the output of said reciprocal number calculation unit reaches the precision as required which has been obtained by said precision obtaining step; wherein a step of repeating the operation by said reciprocal number calculation unit, if the sufficient precision as required is judged as not reached on the basis of the result of said judging step, until the sufficient precision as required of the reciprocal number output from said reciprocal number calculation unit is reached; and a step of outputting the result of the fractional arithmetic operation by multiplying the result of the numerator calculation and the result of said reciprocal number calculation by means of said multiply arithmetic circuit after the sufficient precision as required of the reciprocal number output from said reciprocal number calculation unit is reached.

Furthermore, in accordance with a preferred embodiment of the present invention, when the output of said reciprocal number calculation unit reaches the sufficient precision as required, said outputting step is immediately initiated without repeating the operation.

Furthermore, in accordance with a preferred embodiment of the present invention, a computer-readable medium is embodied a computer program for performing the respective steps of the fractional arithmetic method as described above.

BRIEF DESCRIPTION OF DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 8 is a block diagram showing the internal configuration of the property value variation range judgment unit as illustrated in FIG. 7.

DETAILED DESCRIPTION OF EMBODIMENTS

Other features of this invention will become apparent through the following description of preferred embodiments which are given for illustration of the invention and are not intended to be limiting thereof.

Figure 1:
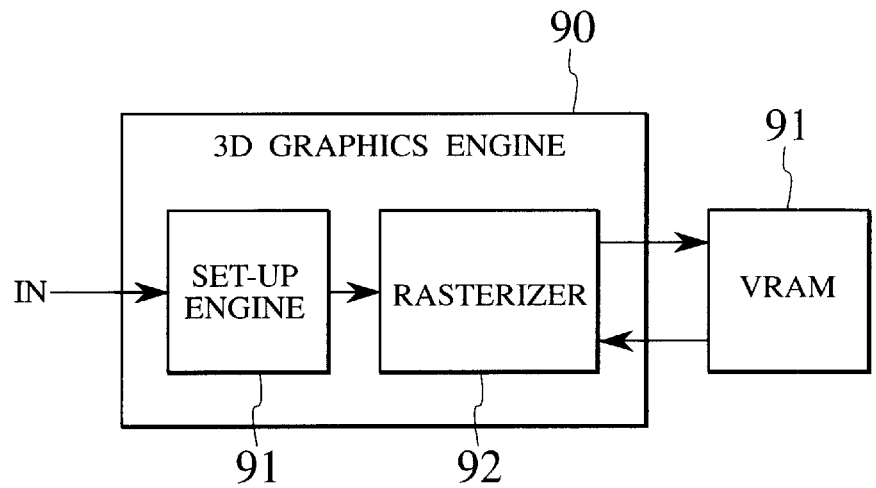
FIG. 1 is a schematic diagram showing the major portions of a prior art 3D graphics system.
Figure 2:
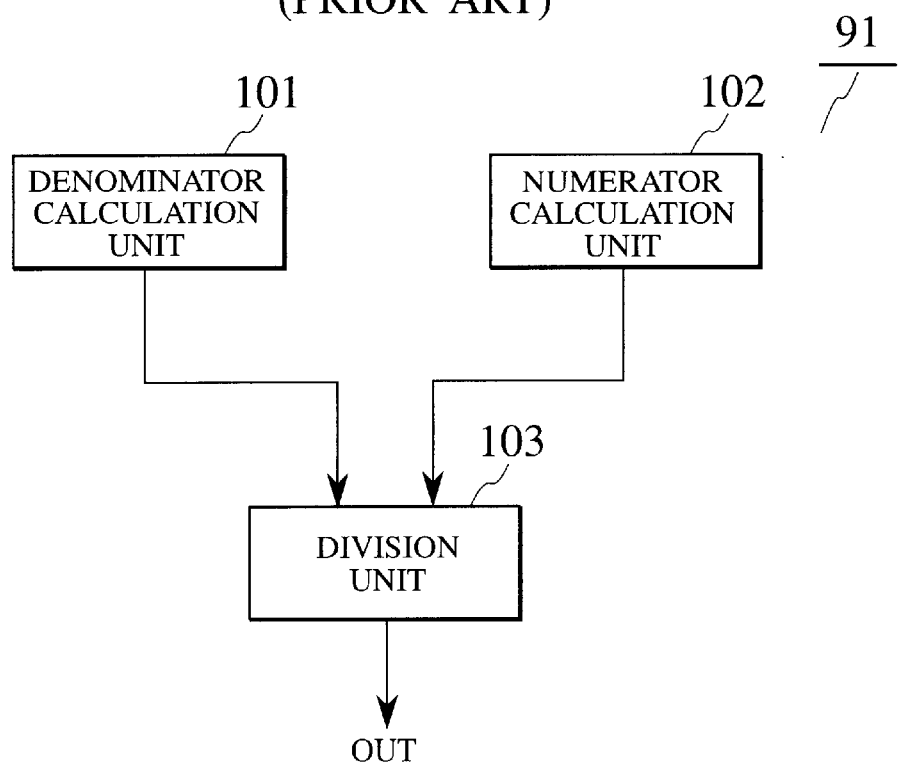
FIG. 2 is a block diagram showing the internal configuration of the set-up engine consisting of a fractional arithmetic unit in accordance with a prior art technique.
Figure 3:
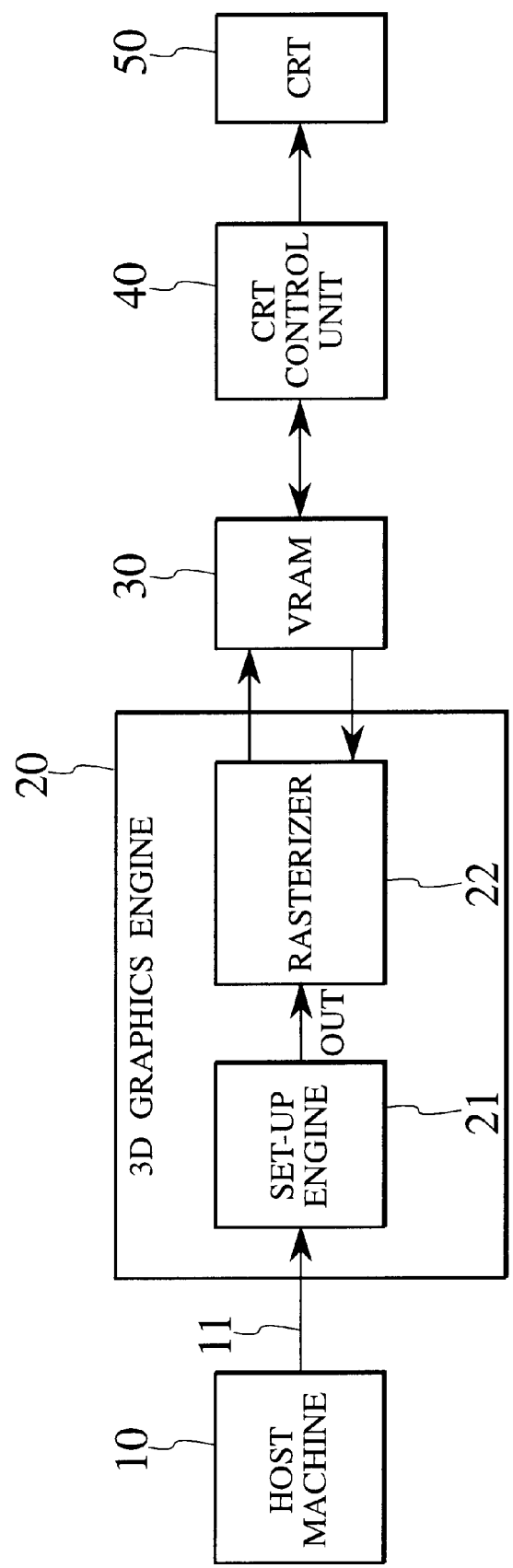
FIG. 3 is a block diagram showing the major portions of a 3D graphics system consisting of the fractional arithmetic unit in accordance with a first embodiment of the present invention.

FIG. 3 is a schematic block diagram showing the major portions of a 3D graphics system provided with a fractional arithmetic unit in accordance with the first embodiment of the present invention.

The 3D graphics system is provided with a host machine 10 composed of a graphic processor as a specific purpose processor. The host machine 10 serves to output command signals to a 3D graphics engine for drawing triangles, rectangles, lines and so forth as draw primitives together with the vertex information (the coordinates and the property values of respective vertices) and given for each of the respective draw primitives through a bus 11.

The 3D graphics engine is composed of a rasterizer 22 which is designed in the same manner as known the technical field and a set-up engine 21 consisting of a fractional arithmetic unit 21 which is one of the characteristic elements of the 3D graphics engine in accordance with this embodiment of the present invention and will be explained in details in the following description.

The set-up engine 21 is supplied with the vertex information output from the host machine 10 while the rasterizer 22 is supplied with the outputs of the set-up engine 21. The output of the rasterizer 22 is supplied to the VRAM 30. The 3D graphical data as expanded onto the VRAM 30 is displayed on the CRT 50 under the control of the CRT control unit 4.

In this case, the VRAM 30 is composed of a memory for storing the bit-map data of the draw primitives which are to be displayed in the CRT 50. The VRAM 30 consists of a frame buffer and other buffers.

Furthermore, the CRT control unit 40 serves to control the serial port of the VRAM 30. The draw data is output from the serial port and is displayed in the CRT 50.

The 3D graphics engine 20 functions as data generating means which serves to generate 3D data in response to draw instruction output from the host machine 10 and serves to draw the 3D data on the bit-map space of the VRAM 30. Because of this, the set-up engine 21 calculates parameters required to the generation of the pixel data by the use of the vertex information as supplied from the host machine 10 and outputs the result of the calculation to the pixel generator of the rasterizer 22.

The rasterizer 22 serves to generate the pixel data on the basis of the parameters as calculated by the set-up engine 21 for the purpose of drawing the draw primitives on the bit-map space of the VRAM 30, and generate the color information, the address information and so forth in order to draw the respective pixels on the corresponding addresses of the VRAM 30.

More specifically speaking, the pixel generator of the rasterizer 22 serves to generate the pixel data, perform linear interpolation, and to calculate color values of (R,G and B, i.e., red, green and blue), α values(A), fog coefficients (A), texture coordinates (STRQ), and depth values (Z), usually by the sequentially accumulative addition in the same manner as the prior art pixel generator. Meanwhile, the rasterizer 22 in this embodiment 1 of the present invention is designed as a fixed point rasterizer so that the output of the set-up engine 21 is assumed to be fixed point values.

Figure 4:
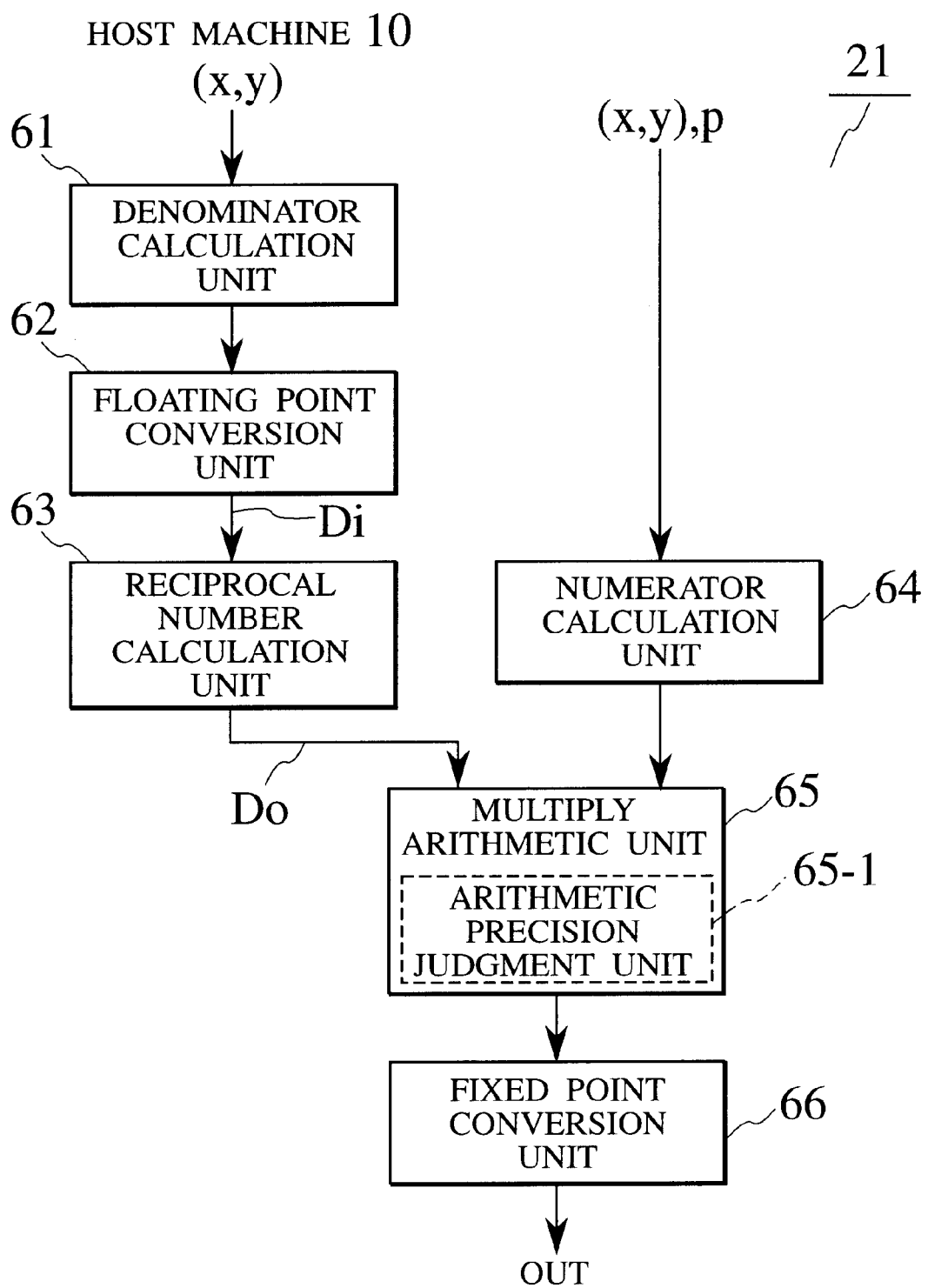
FIG. 4 is a block diagram showing the internal configuration of the set-up engine consisting of the fractional arithmetic unit as illustrated in FIG. 3.

FIG. 4 is a block diagram showing the internal configuration of the set-up engine 21 in accordance with the embodiment 1 as illustrated in FIG. 3. The set-up engine 21 is composed of a fractional arithmetic unit.

The set-up engine 21, i.e., the fractional arithmetic unit is composed of a denominator calculation unit 61 for calculating denominators from the coordinates of the vertices (x,y) of triangles, rectangles, lines and so forth as draw primitives, a floating point conversion unit 62 for converting the output of the denominator calculation unit 61 into floating point values, a reciprocal number calculation unit 63 for calculating the reciprocal number of the output Di (the fraction part) of the floating point conversion unit 62.

The reciprocal number calculation unit 63 is composed of a reciprocal number arithmetic logic circuit which improves the precision of calculation by increasing the calculation repetition number (frequency) on the basis of the Newton method. The details of the reciprocal number arithmetic logic circuit will be explained later with reference to FIG. 5.

The set-up engine 21, i.e., the fractional arithmetic unit is composed of a numerator calculation unit 64 for calculating the numerator by the use of the property values p and the coordinates of the vertices (x,y) of a triangle, and a multiply arithmetic unit 65 for multiplying the output Do of the reciprocal number calculation unit 63 and the output of the numerator calculation unit 64.

The multiply arithmetic unit 65 is provided with an arithmetic precision judgment unit 65-1 for judging whether or not the output of the reciprocal number calculation unit 63 has a sufficient precision as required in advance for the fractional arithmetic operation.

When the output of the reciprocal number calculation unit 63 is judged as not reaching the sufficient precision as required by the arithmetic precision judgment unit 65-1, the reciprocal number arithmetic operation is repeated until the output of the reciprocal number calculation unit 63 reaches the sufficient precision as required. The multiply arithmetic unit 65 initiates a multiply arithmetic operation when the sufficient precision as required is reached.

The output of the multiply arithmetic unit 65 is converted to a fixed point value by the fixed point conversion unit 66. The fixed point value as converted is output as the output signal OUT of the set-up engine 21 to the rasterizer 22.

In this manner, the fractional arithmetic unit as the set-up engine 21 within the 3D data of the embodiment 1 in accordance with the present invention is implemented as a floating point arithmetic unit which calculates the reciprocal number of denominators and perform the multiply operation of the reciprocal number and the numerator of each property value, converts the result of multiplication to fixed point values and outputs the fixed point values as the result of the fractional arithmetic operation.

Figure 5:
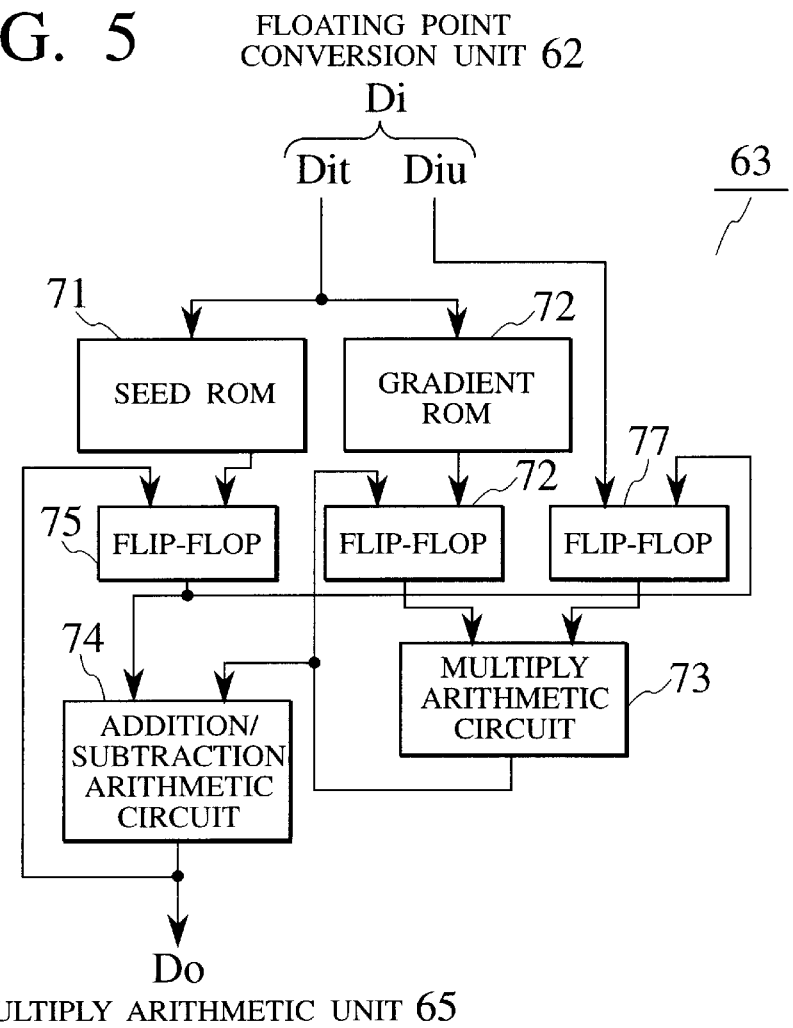
FIG. 5 is a block diagram showing the internal configuration of the reciprocal number calculation unit as illustrated in FIG. 3.

FIG. 5 is a block diagram showing the internal configuration of the reciprocal number calculation unit 63.

The reciprocal number calculation unit 63 is a reciprocal number arithmetic logic circuit which is operated by making use of the repetition technique (the Newton method) and is composed of the seed ROM 71 for storing seed values (the reference value) for use in the reciprocal number arithmetic operations, a gradient ROM 72 for storing gradient values, a multiply arithmetic circuit 73, an addition/subtraction arithmetic circuit 74, three flip-flop (FF) 75, 76 and 77 provided with the selector circuits respectively. Meanwhile, another means such as tables can be used in place of the ROMs for storing the seed values and the gradient values.

In accordance with the reciprocal number calculation unit 63, when the seed ROM 71 and the gradient ROM 72 are given a Dit signal consisting of the high-order or most-significant bits of the fraction part D1 as output from the floating point conversion unit 62, the seed ROM 71 and the gradient ROM 72 output respectively the seed value and the gradient value corresponding to the Dit signal for use in the first reciprocal number arithmetic logic operation. The seed value as obtained is latched by the flip-flop 75 provided with the selector circuit while the gradient value as obtained is latched by the flip-flop 76 provided with the selector circuit. At the same time, a Diu signal consisting of the low-order or least-significant bits of the fraction part D1 is latched by the flip-flop 77 provided with the selector circuit.

The values as latched by the flip-flop 76 and the flip-flop 77 are multiplied by the multiply arithmetic circuit 73. The addition/subtraction arithmetic circuit 74 performs addition/subtraction arithmetic operations using the output value of the multiply arithmetic circuit 73 and the values as latched by the flip-flop 75 in order to output the first result Do of the reciprocal number arithmetic operation. The result Do of the reciprocal number arithmetic operation is output to the multiply arithmetic unit 65.

The reciprocal number arithmetic operation is performed in a roughly manner by the use of the seed value and the gradient value as obtained from the Dit signal, followed by compensation by making use of the Diu signal.

The result Do of the first reciprocal number arithmetic operation is latched again by the flip-flop 75 and used in the next arithmetic operation which is subsequently initiated. Namely, in the second reciprocal number arithmetic operation, the previous output value of the multiply arithmetic circuit 73 and the previous result Do of the reciprocal number arithmetic operation are multiplied together by means of the multiply arithmetic circuit 73, and then the result of multiplication and the previous result Do of the reciprocal number arithmetic operation are used for the operations in the addition/subtraction arithmetic circuit 74 in order to output the second result Do of the reciprocal number arithmetic operation.

In this manner, the reciprocal number calculation unit 63 repeats arithmetic operations in order to improve the precision of calculation in steps.

In the case that the draw primitive to be rasterized is a triangle, the set-up engine 21 serves to calculate the gradient of the property values required in the rasterizer 22 by the use of the property values (p0, p1 and p2) of the respective vertices of the triangle on the basis of the equation (1). Since there are a number of the property values as described above, the set-up engine 21 perform the arithmetic operations required of the equation (1) for each of the property values. Namely, while the denominator is commonly used, the numerator is calculated anew for each of the property values (p0, p1 and p2) by the fractional arithmetic unit as the set-up engine 21 as illustrated in FIG. 4.

Next, the fractional arithmetic operations in accordance with this embodiment 1 of the present invention will be explained as the respective sequence of operations with reference to FIG. 6.

The coordinates of the vertices (x,y) of the triangle is inputted to the denominator calculation unit 61 of the set-up engine 21 as illustrated in FIG. 3 in order to calculate the denominator calculation unit (e0: twice the area of the triangle). The result of calculation is inputted to the floating point conversion unit 62 and converted to a floating point value which is then outputted to the reciprocal number calculation unit 63.

The reciprocal number calculation unit 63 calculates the reciprocal number thereof in accordance with the repetition technique. At this time, the calculation is repeated to reach the precision as required for the fractional arithmetic operation.

On the other hand, the property values p and the coordinates of the vertices (x,y) of the triangle is inputted to the numerator calculation unit 64 in order to calculate the numerators. The result of calculation is multiplied with the output of the reciprocal number calculation unit 63 and converted to a fixed point value in order to output the final result.

In this case, the respective property values may have different bit lengths (n) as required. For example, the color information (RGBA) has a bit length as required of 8 bits; the Z value has a bit length as required of 16 bits, 24 bits or 32 bits; and the texture coordinate has a bit length as required of 16 bits. The bit lengths as required of 1/e0 may be different from each other in this manner. In the actual case, therefore, the following procedure is conducted.

The numerator calculation operation is performed sequentially for the property values in such an order as from the property value having a narrower bit length as required to the property value having a longer bit length as required. In the multiply arithmetic unit 65, it is judged whether or not the output of the reciprocal number calculation unit 64 has a sufficient precision as required for the current property value.

If the precision of calculation as required is not reached, the multiply arithmetic operation is not initiated until the sufficient precision as required is reached. When the sufficient precision as required is reached, the reciprocal number and the result of the numerator calculation are multiplied together.

If the arithmetic precision judgment unit 65 judges that the precision of calculation as required is reached by the initial reciprocal number arithmetic operation, the multiply arithmetic unit 65 initiates the multiply arithmetic operation without repetition.

Next, the precision of calculation of the fractional arithmetic unit as the set-up engine 21 in accordance with this embodiment 1 of the present invention will be explained in details.

If the final result of the property values is required to have n-bit precision, the set-up engine 21 has to output the parameters such as the gradient values of the property values to the rasterizer 22 taking into consideration the internal operation error in the rasterizer 22. This procedure can be finished when the error of the property values for the respective pixels in the triangle is less than 1.

When the value of 1/e0 is converted to the floating point value, we have $$1/e0 = a + b \qquad (2)$$

$$0 < b/(a+b) < 2^{-m} \qquad (3)$$

where the most significant m bits and the remaining bits are represented by "a" and "b".

Figure 6:
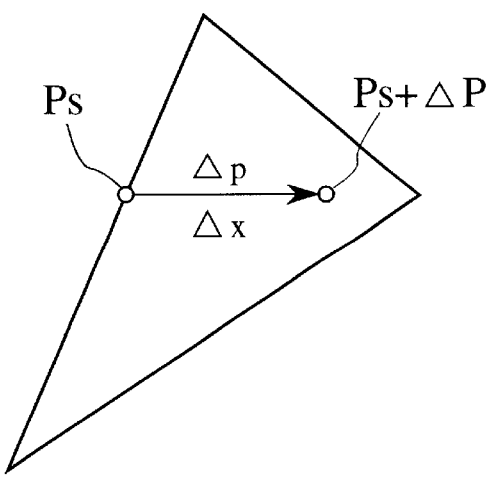
FIG. 6 is a view for explaining the property values p of a pixel located within a triangle.

As illustrated in FIG. 6, the property value p satisfies the following equation (4) in the triangle.

$$\begin{aligned} p &= ps + \Delta p \qquad (4)\\ &= ps + \partial p/\partial x * \Delta p\\ &= ps + c/e0 * \Delta x\\ &= ps + c * 1/e0 * \Delta x\\ &= ps + c * (a+b) * \Delta x \end{aligned}$$

In this equation, "c" is the denominator of the equation (1). Also, the property value p satisfies $$0 \leq p < 2^n$$

where the integer bit length of the property value p is represented by "n", and then $$0 \leq |\Delta p| < 2^n$$

$$0 \leq |c*(a+b)*\Delta x| < 2^n$$

In this equation, if $$1/e0 \approx a$$

then the error satisfies $$|\delta p| = |c * b * \Delta x| \quad (5)$$
$$= |\Delta p/| * |b/(a+b)|$$
$$< 2^n * 2^{-m} \quad (6)$$

Since the error must be less than 1 in the triangle area, $$2^n * 2^{-m} \leq 1 n \leq m.$$

Accordingly, after the value of 1/e0 is converted to the floating point value, the precision of calculation as required can be obtained by making use of the most significant n bits.

As explained above, in accordance with this embodiment 1 of the present invention, if the sufficient precision as required is not reached, the reciprocal number arithmetic operation is repeated until the output of the reciprocal number calculation unit 63 reaches the sufficient precision as required. The multiply arithmetic unit 65 initiates the multiply arithmetic operation of the numerator calculation unit and the reciprocal number when the sufficient precision as required is reached so that the number of the clocks as required for the reciprocal number arithmetic operation by the set-up engine 21 can be dynamically adjusted in accordance with the precision required. For example, the calculation of the Z values which requires higher precision of calculation can be initiated without undue wait cycles resulting in effective use of the hardware resources. In other words, it becomes possible to cut down the cost of the hardware resources and to improve the processing speed.

Second Embodiment

While the embodiment 1 in accordance with the present invention as explained above is explained on the assumption that the precision as required of the fractional arithmetic operation is predetermined in advance for each of the respective fractional arithmetic operations, the precision as required of the fractional arithmetic operation is dynamically changed in accordance with variation of the property value in accordance with in this embodiment 2 of the present invention.

Figure 7:
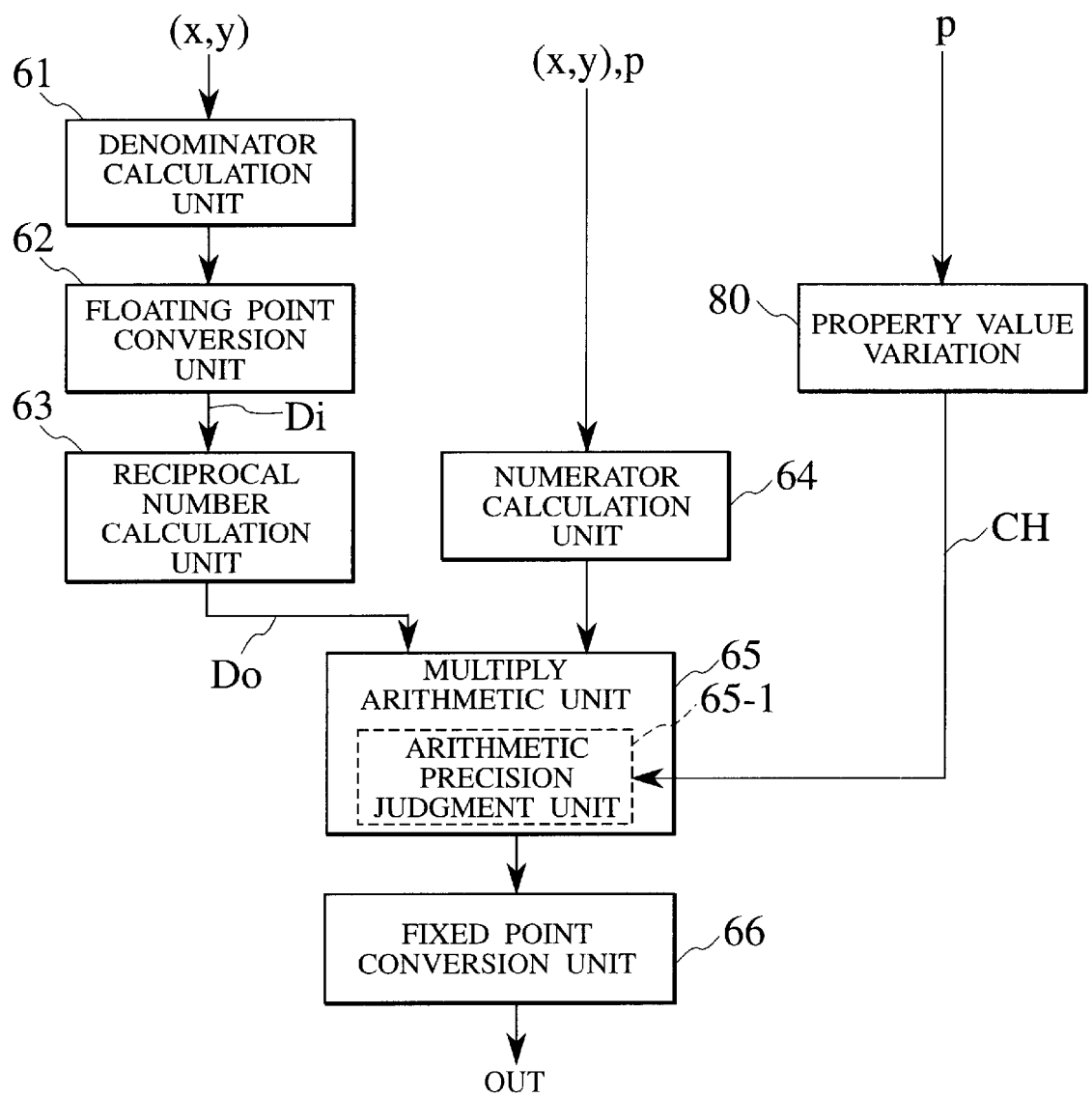
FIG. 7 is a schematic block diagram showing the configuration of a fractional arithmetic unit in accordance with a second embodiment of the present invention.

FIG. 7 is a schematic block diagram showing the configuration of a fractional arithmetic unit in accordance with the second embodiment of the present invention. In the figure, similar elements are given similar references as given to the set-up engine 21, i.e., the fractional arithmetic unit of the first embodiment in accordance with the present invention as illustrated in FIG. 4.

The fractional arithmetic unit of the embodiment 2 as illustrated in FIG. 7 is designed as an instance of the set-up engine 21 of the 3D data as illustrated in FIG. 3 for replacing the fractional arithmetic unit of the embodiment 1 as illustrated in FIG. 4.

The fractional arithmetic unit of in this embodiment 2 of the present invention is composed of a property value variation range judgment unit 80 in addition to the respective constituent elements of the fractional arithmetic unit as illustrated in FIG. 4.

The property value variation range judgment unit 80 serves to obtain the variation range of the property value p from the actually inputted property values p, and judge the precision of calculation CH as required of the reciprocal number calculation unit 63.

FIG. 8 is a block diagram showing the internal configuration of the property value variation range judgment unit 80.

The property value variation range judgment unit 80 is composed of a maximum value obtaining unit 81 for obtaining the maximum values of the respective property value p(p0, p1 and p2), a minimum value obtaining unit 82 for obtaining the minimum values of the respective property value p(p0, p1 and p2), a subtractor 83 for calculating the maximum variation max($|\Delta p|$) of the property value, i. e., the maximum value minus the minimum value, and a comparator 84 for obtaining the precision of calculation CH of the reciprocal number calculation unit 63 with reference to the maximum variation max($|\Delta p|$).

Next, the fractional arithmetic operations conducted by the fractional arithmetic unit in accordance with this embodiment 2 of the present invention will be explained relating to the respective sequence of operations.

For example, the coordinates of the vertices (x,y) of a triangle is inputted to the denominator calculation unit 61 in order to calculate the denominator calculation unit (e0: twice the area of the triangle). The result of calculation is inputted to the floating point conversion unit 62 and converted to floating point values which are then outputted to the reciprocal number calculation unit 63. The reciprocal number calculation unit 63 calculates the reciprocal number thereof in accordance with the repetition technique.

On the other hand, the property values p and the coordinates of the vertices (x,y) of the triangle are inputted to the numerator calculation unit 64 in order to calculate the numerators. At the same time, the precision of calculation CH as required of the reciprocal number calculation unit 63 is determined by the property value variation range judgment unit 80 from the respective property value p(p0, p1 and p2) as input by calculating the variation range of the property value.

The operation of the property value variation range judgment unit 80 will be described in the following explanation in details.

From the maximum variation max($|\Delta p|$) as obtained by the subtractor 83, the variation range ($\Delta p$) of the property value in the triangle is such that $$0 \leq |\Delta p| \leq \max(|\Delta p|).$$

From the following equations (5) and (6) as explained in the description of the embodiment 1, the error $\delta p$ of the property value p in the triangle satisfies $$|\delta p| < |\Delta p| * 2^{31\ m}$$

$$|\delta p| < \max(|\Delta p|) * 2^{-m}$$

$|\delta p| < 1$ is always true if $$\max(|\Delta p|) * 2^{-m} \leq 1$$

$$\log_2(|\Delta p|) \leq m.$$

Namely, in the case that $2^{r-1} \leq |\Delta p| < 2^r$, the precision of calculation CH of the reciprocal number calculation unit 63 is sufficiently represented by "r" bits.

The arithmetic precision judgment unit 65-1 of the multiply arithmetic circuit 65 serves to judge whether or not the reciprocal number Do outputted from the reciprocal number calculation unit 63 reaches the precision of calculation CH as required. If the sufficient precision is not reached, the multiply arithmetic operation is not initiated until the sufficient precision of the reciprocal number output from the reciprocal number calculation unit 63 as required is reached. When the sufficient precision as required is reached, the reciprocal number and the result of the numerator calculation are multiplied together.

If the arithmetic precision judgment unit 65 judges that the precision of calculation as required is reached by the initial reciprocal number arithmetic operation, the multiply arithmetic unit initiates the multiply arithmetic operation without repetition.

Since the precision of calculation as required is determined for the respective property values as inputted in accordance with this embodiment 2 of the present invention, the number of the clocks as consumed is dynamically adjusted, undue wait cycles are avoided resulting in effective use of the hardware resources.

Furthermore, the fractional arithmetic technique in accordance with this embodiment 2 of the present invention is particularly effective for the calculation of the Z values which require a higher precision of calculation. Namely, in usual cases, the data inputted to the rasterizer 22 has been subjected to a perspective transformation process in order that nearer objects are drawn with larger sizes while remoter objects are drawn with smaller sizes.

Since the Z value has also been subjected to a perspective transformation process in order that the variation of the Z value is wider in nearer positions (i.e., max($|\Delta p|$) becomes larger) while the variation of the Z value is narrower in remoter positions (i.e., max($|\Delta p|$) becomes smaller).

Namely, in usual cases, the variation of the Z value is large if the area of a triangle is large while the variation of the Z value is small if the area of a triangle is small. The performance of the 3D graphics engine is determinate by worse one of the performances of the set-up engine and the rasterizer, i.e., determinate by the performance of the set-up engine if the area of a triangle is small and determinate by the performance of the rasterizer if the area of a triangle is large.

It is therefore effective to change the performance of the 3D graphics engine depending upon the areas of triangles for improving the performance if the area of a triangle is small for the purpose of improving the overall performance of the 3D graphics engine.

While the present invention is applied for the 3D computer graphics technique in the cases of the embodiment 1 and the embodiment 2, the present invention is not limited to this application but applicable also to a variety of systems in which the precision as required dynamically changes in the fractional arithmetic operations.

Furthermore, the fractional arithmetic method in accordance with the present invention can be implemented as a software control by storing a program for carrying out the above described process as performed by the fractional arithmetic unit in a computer-readable medium, reading the program from the computer-readable medium and actually invoking the program.

As explained in the above description, in accordance with the present invention, the number of the clocks as required for the fractional arithmetic operation can be dynamically changed in accordance with the precision required for the respective property values, and therefore even in the case of the fractional arithmetic operation of the set-up engine for handling graphic images which requires a higher precision, it is possible to perform high speed operations with a relatively less hardware resources.

Furthermore, in accordance with the present invention, the precision as required for the fractional arithmetic operation is determined for each property value and therefore even in the case of the fractional arithmetic operation of the set-up engine for handling graphic images which requires a higher precision, it is possible to perform high speed operations with a relatively less hardware resources.

Furthermore, the performance of the 3D graphics engine is adjusted depending upon the areas of the draw primitive, and therefore for example, the overall performance of the 3D graphics engine can be improved if the area of the draw primitive is small.

While the above provides a full and complete disclosure of the preferred embodiment of the invention, various modifications, alternate constructions and equivalents will occur to those skilled in the art. Therefore, the above should not be construed as limiting the invention, which is defined by the appended claims.

What is claimed is:

1. A fractional arithmetic unit for performing fractional arithmetic operations of different numerators and a common denominator with different precisions as required, said fractional arithmetic unit comprising:

a denominator calculation unit configured to calculate a denominator from an input value;

a numerator calculation unit configured to calculate a numerator from said input value;

a floating point conversion unit configured to convert an output of said denominator calculation unit to a floating point value;

a reciprocal number calculation unit configured to perform the reciprocal number arithmetic operation configured to obtain a reciprocal number of an output of said floating point conversion unit on a basis of a repetition technique configured to improve a precision of calculation by repeating the operation; and a multiply arithmetic circuit configured to multiply an output of said reciprocal number calculation unit and an output of said numerator calculation unit, wherein said multiply arithmetic circuit is composed of an arithmetic precision judgment unit configured to judge whether or not the output of said reciprocal number calculation unit reaches the precision as required for each of fractional arithmetic operations to be performed;

wherein if said arithmetic precision judgment unit makes a judgment as not reaching one of said different precisions corresponding to each of said fractional arithmetic operations, said reciprocal number calculation unit continues repeating the reciprocal number arithmetic operation for said each of said fractional arithmetic operations until the output of said reciprocal number calculation unit reaches said one of said different precisions; and wherein when said one of said different precisions is reached, said multiply arithmetic unit initiates the multiply arithmetic operation and outputs a result of multiplication as an output of said fractional arithmetic operation.

2. The fractional arithmetic unit as claimed in claim 1, wherein if said arithmetic precision judgment unit judges that the precision of calculation as required is reached, the multiply arithmetic operation by said multiply arithmetic circuit is immediately initiated without further repetition.

3. A set-up engine for handling graphic images comprising the fractional arithmetic unit as claimed in claim 2 wherein the fractional arithmetic operation as performed by said fractional arithmetic unit is to calculate the gradient value of property values as assigned respectively to the pixels constituting draw primitives in the X-direction and in the Y-direction.

4. A fractional arithmetic method for subsequently performing fractional arithmetic operations from an operation thereof having a lower precision as required to an operation thereof having a higher precision as required in which, while a common denominator is used for said fractional arithmetic operations, a numerator of each fractional arithmetic operation is calculated a new by a fractional arithmetic unit comprising:
- a denominator calculation unit configured to calculate a denominator from an input value;
- a numerator calculation unit configured to calculate a numerator from said input value;
- a floating point conversion unit configured to convert an output of said denominator calculation unit to a floating point value;
- a reciprocal number calculation unit configured to perform the reciprocal number arithmetic operation configured to obtaining a reciprocal number of an output of said floating point conversion unit on a basis of a repetition technique configured to improve a precision of calculation by repeating the operation; and
- a multiply arithmetic circuit configured to multiply an output of said reciprocal number calculation unit and an output of said numerator calculation unit, wherein each fractional arithmetic operation is performed by:
- calculating by calculating said denominator from said input value by means of said denominator calculation unit;
- calculating said numerator from said input value by means of said numerator calculation unit;
- converting a result of the calculation from said denominator calculating step to a floating point value by means of said floating point conversion unit;
- calculating a reciprocal number of said denominator as converted by said floating point conversion step by means of said reciprocal number calculation unit;
- judging whether or not the output of said reciprocal number calculation unit has a sufficient precision as required for each of a plurality of said fractional arithmetic operations for the purpose of achieving said precision as required which has been predetermined;
- repeating the operation by said reciprocal number calculation unit, if the sufficient precision as required is judged as not reached on a basis of a result of said judging step, until the sufficient precision as required of the reciprocal number output from said reciprocal number calculation unit is reached; and
- outputting a result of each of said fractional arithmetic operations by multiplying a result of a numerator calculation and a result of said reciprocal number calculation by means of said multiply arithmetic circuit after the sufficient precision as required of the reciprocal number output from said reciprocal number calculation unit is reached wherein the results of said fractional arithmetic operations are output with different precisions.

5. The fractional arithmetic method as claimed in claim 4 wherein, when the output of said reciprocal number calculation unit reaches the sufficient precision as required, said outputting step is immediately initiated without repeating the operation.

6. A computer-readable medium on which is embodied a computer program for performing the respective steps of the fractional arithmetic method as recited in claim 5.

7. A computer-readable medium on which is embodied a computer program for performing the respective steps of the fractional arithmetic method as recited in claim 4.

8. A fractional arithmetic unit comprising:
- a denominator calculation unit configured to calculate a denominator from an input value;
- a numerator calculation unit configured to calculate a numerator from said input value;
- a floating point conversion unit configured to convert an output of said denominator calculation unit to a floating point value;
- a reciprocal number calculation unit configured to perform the reciprocal number arithmetic operation configured to obtain a reciprocal number of an output of said floating point conversion unit on a basis of a repetition technique for improving the precision of calculation by repeating the operation; and
- a precision obtaining unit configured to obtain the precision as required of the fractional arithmetic operation by said reciprocal number calculation unit from said input value;
- a multiply arithmetic circuit configured to multiply an output of said reciprocal number calculation unit and an output of said numerator calculation unit,
- said multiply arithmetic circuit is composed of an arithmetic precision judgment unit configured to judging whether or not the output of said reciprocal number calculation unit reaches the precision as required which has been obtained by said precision obtaining unit;
- wherein if said arithmetic precision judgment unit makes a judgment as not reaching a sufficient precision as required, said reciprocal number calculation unit continues repeating the reciprocal number arithmetic operation until the output of said reciprocal number calculation unit reaches the sufficient precision as required;
- wherein when the sufficient precision as required is reached, said multiply arithmetic unit initiates the multiply arithmetic operation and outputs a result of multiplication as an output of said fractional arithmetic operations,
- wherein the results of said fractional arithmetic operations are output with different precisions.

9. The fractional arithmetic unit as claimed in claim 8 wherein if said arithmetic precision judgment unit judges that the precision of calculation as required is reached, the multiply arithmetic operation by said multiply arithmetic circuit is immediately initiated without further repetition.

10. The set-up engine for handling graphic images comprising the fractional arithmetic unit as claimed in claim 9 wherein the fractional arithmetic operation as performed by said fractional arithmetic unit is to calculate the gradient value of property values as assigned respectively to the pixels constituting draw primitives in the X-direction and in the Y-direction.

11. The set-up engine for handling graphic images as claimed in claim 10 wherein the maximum variations of the respective property values corresponding to all the vertices of draw primitives are calculated by obtaining the maximum and minimum values of the respective property values; and wherein said precision is calculated on a basis of said maximum variations.

12. The set-up engine for handling graphic images comprising the fractional arithmetic unit as claimed in claim 8 wherein the fractional arithmetic operation as performed by said fractional arithmetic unit is to calculate the gradient value of property values as assigned respectively to the pixels constituting draw primitives in the X-direction and in the Y-direction.

13. The set-up engine for handling graphic images as claimed in claim 12 wherein the maximum variations of the respective property values corresponding to all the vertices of draw primitives are calculated by obtaining the maximum and minimum values of the respective property values; and wherein said precision is calculated on a basis of said maximum variations.

14. A fractional arithmetic method for subsequently performing fractional arithmetic operations from an operation thereof having a lower precision as required to an operation thereof having a higher precision as required in which, while a common denominator is used for said fractional arithmetic operations, a numerator of each fractional arithmetic operation is calculated a new by a fractional arithmetic unit comprising:

a denominator calculation unit configured to calculate a denominator from an input value;

a numerator calculation unit configured to calculate a numerator from said input value;

a floating point conversion unit configured to convert an output of said denominator calculation unit to a floating point value;

a reciprocal number calculation unit configured to perform the reciprocal number arithmetic operation for obtaining a reciprocal number of an output of said floating point conversion unit on a basis of a repetition technique for improving a precision of calculation by repeating the operation; and a multiply arithmetic circuit configured to multiply an output of said reciprocal number calculation unit and an output of said numerator calculation unit, wherein each fractional arithmetic operation is performed by:

calculating by calculating said denominator from said input value by means of said denominator calculation unit;

calculating said numerator from said input value by means of said numerator calculation unit;

converting a result of the calculation from said denominator calculating step to a floating point value by means of said floating point conversion unit;

calculating the reciprocal number of said denominator as converted by said floating point conversion step by means of said reciprocal number calculation unit;

obtaining the precision as required of the fractional arithmetic operation by said reciprocal number calculation unit from said input value;

judging whether or not the output of said reciprocal number calculation unit reaches the precision as required which has been obtained by said precision obtaining step;

repeating the operation by said reciprocal number calculation unit, if a sufficient precision as required is judged as not reached on a basis of the a of said judging step, until the sufficient precision as required of the reciprocal number output from said reciprocal number calculation unit is reached; and outputting the result of the fractional arithmetic operation by multiplying the result of the numerator calculation and the result of said reciprocal number calculation by means of said multiply arithmetic circuit after the sufficient precision as required of the reciprocal number output from said reciprocal number calculation unit is reached, wherein the results of said fractional arithmetic operations are output with different precisions.

15. The fractional arithmetic method as claimed in claim 14 wherein, when the output of said reciprocal number calculation unit reaches the sufficient precision as required, said outputting step is immediately initiated without repeating the operation.

16. A computer-readable medium on which is embodied a computer program for performing the respective steps of the fractional arithmetic method as recited in claim 15.

17. A computer-readable medium on which is embodied a computer program for performing the respective steps of the fractional arithmetic method as recited in claim 14.

* * * * *